United States Patent Office 2,744,128
Patented May 1, 1956

2,744,128

OLEFINICALLY UNSATURATED PHOSPHATES

Rupert C. Morris, Berkeley, and John L. Van Winkle, San Lorenzo, Calif., assignors to Shell Development Company, Emeryville, Calif., a corporation of Delaware No Drawing. Application February 29, 1952, Serial No. 274,304

12 Claims. (Cl. 260—461)

This invention relates to novel compounds containing phosphorus and it more particularly relates to the novel unsaturated cyclic phosphates having the structure represented by the general formula

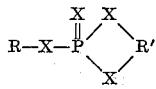

in which R is the residue R of an alpha, beta-olefinically unsaturated alcohol ROH, and R' is the divalent residue R' of a dihydric alcohol HO—R'—OH wherein the hydroxyl groups are substituted on different carbon atoms separated from each other by not more than one intervening carbon atom. Each X represents a divalent atom of a non-metallic element of the chalcogen group, especially oxygen or sulfur. Those of the new unsaturated cyclic phosphates of this formula in which the X's linked by single bonds to the phosphorus atom are divalent oxygen atoms are 2-hydroxy-2-oxo-1,3,2-dioxaphospholanes, 2-hydroxy-2-oxo-1,3,2-dioxaphosphorinanes, and the 2-thiono analogues of these compounds.

We have discovered in accordance with this invention that the new compounds represented by the above formula can be prepared. We provide by the invention of the compounds represented by the above formula, relatively stable, useful products which are well adapted to production and use on large scale and which have properties that are useful in fields of present-day technical importance. The following are illustrative of the class of compounds which is provided in accordance with our invention:

2-(beta,beta-dichlorovinyloxy)-2-oxo - 1,3,2 - dioxaphospholane, having the structure:

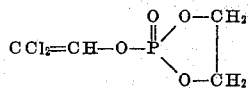

2-(beta-chlorovinyloxy)-2-oxo-1,3,2 - dioxaphosphorinane, having the structure:

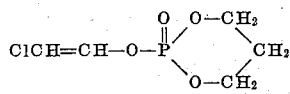

2-vinyloxy-4-(2-phenoxyethyl)-2-oxo - 1,3,2 - dioxaphosphorinane, having the structure:

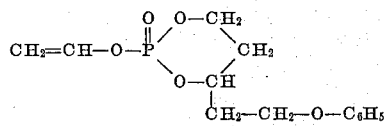

2-vinyloxy-5-allyloxy-2-oxo - 1,3,2 - dioxaphosphorinane, having the structure:

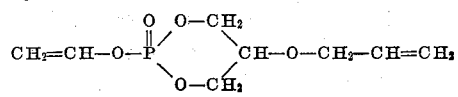

2-vinyloxy-2-oxo-1,3,2-dioxaphospholane, having the structure:

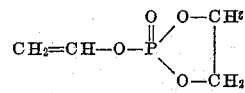

2-isobutenyloxy-2-thiono-1-oxa-3-thia - 2 - phosphorinane, having the structure:

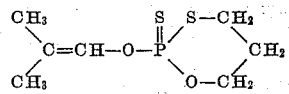

The new compounds which are provided by the present invention can be prepared starting with such readily obtainable materials as phosphorus trihalides, such as phosphorus trichloride, or phosphorus oxyhalides or thiohalides, such as phosphorus oxychloride, 1,3-glycols and 1,2-glycols, and acetylenic hydrocarbons or certain halogen-substituted aldehydes and ketones. According to one method of synthesis phosphorus oxychloride may be reacted with a 1,2- or 1,3-alkylene glycol or a substituted 1,2- or 1,3-alkylene glycol, such as a glycerol monoether or monohalohydrin, to produce the corresponding cyclic halophosphate or halothionophosphate. In place of the glycol there may be employed a 1,2- or 1,3-dithiol or a 2- or 3-mercaptoalcohol to produce the corresponding cyclic halophosphates containing sulfur in the ring. The cyclic halophosphate then may be partially hydrolyzed so as to replace the halogen which is bonded to the phosphorus atom by a hydroxyl group while leaving the ring intact. The resulting cyclic monohydrogen phosphate then may be added to an acetylenic hydrocarbon, such as acetylene or one of its homologs, or a halogen-substituted acetylenic hydrocarbon, in the presence of a catalyst, such as mercuric sulfate, to obtain the desired unsaturated cyclic phosphate of this invention.

A specific illustration of the general method of synthesis outlined in the preceding paragraph is the preparation of 2-(3 - chloropropenyloxy)-2-oxo-1,3,2-dioxaphospholane from ethylene glycol, phosphorus oxychloride, and propargyl chloride. Dilute solutions of ethylene glycol and phosphorus oxychloride in an inert solvent, such as chloroform, are combined in the theoretical proportions and slowly run into a heated flask from which hydrogen chloride is withdrawn by boiling and sweeping with a stream of nitrogen gas as rapidly as evolved in the reaction. When the theoretical amount of hydrogen chloride has been evolved the mixture is rapidly distilled in vacuo to remove the solvent and to separate the cyclic ester 2-chloro-2-oxo-1,3,2-dioxaphospholane from higher-boiling, polymeric by-products. To a solution of the stoichiometric amount of water in a water-miscible solvent, such as dioxane, there is slowly added the 2-chloro-2-oxo-1,3,2-dioxaphospholane preferably in the form of a solution in an additional amount of water-miscible solvent, while withdrawing evolved hydrogen chloride as by application of vacuum during the reaction. The resulting mixture then may be fractionally distilled so as to separate from it the desired monohydrogen 1,2-ethylene phosphate, or 2-hydroxy-2-oxo-1,3,2-dioxaphospholane. Into a solution of the 2-hydroxy-2-oxo-1,3,2-dioxaphospholane in an inert solvent, such as a hydrocarbon solvent, containing a small amount of added mercuric sulfate or other catalyst for the addition of hydroxylic compounds to acetylene, such as BF₃, etherate, mercuric phosphate, cadmium propionate, or the like, there is added about one mole of propargyl chloride per mole of the 2-hydroxy-2-oxo-1,3,2-dioxaphospholane and the mixture is gently heated. Upon completion of the reaction the catalyst is removed, as by washing, and the mixture is distilled to recover the 2-(3-chloropropenyloxy)-2-oxo-1,3,2-dioxaphospholane.

The reactions may be represented as follows:

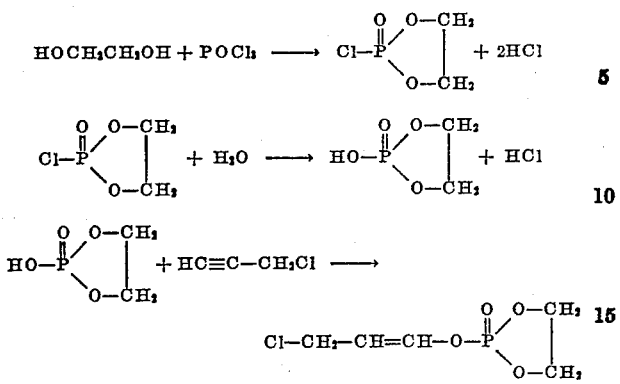

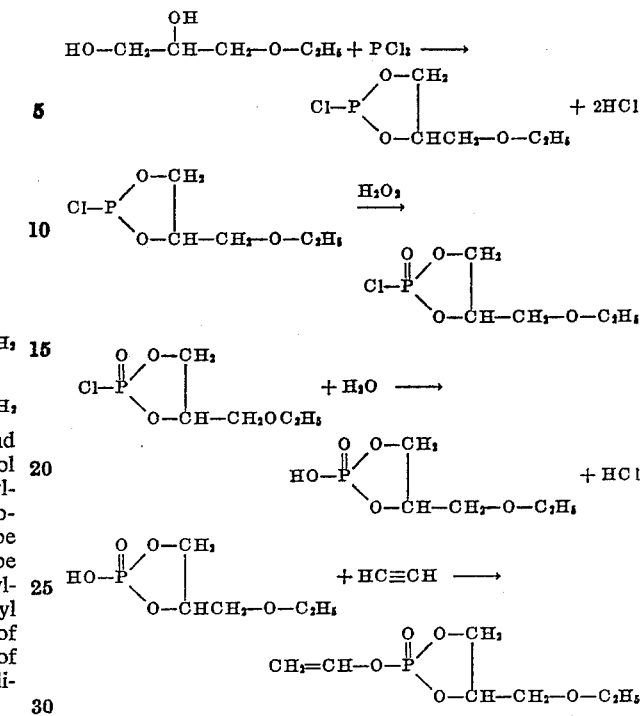

By employing other 1,2- or 1,3-glycols, such as 1,2- and 1,3-alkylene glycols, glycerol monoethers, and glycerol monohalohydrins, corresponding 2-(3-chloropropenyloxy)-2-oxo - 1,3,2 - dioxaphospholanes and 2-(3-chloropropenyloxy)-2-oxo-1,3,2-dioxaphosphorinanes may be prepared. In place of propargyl chloride there may be employed other halogen substitution products of acetylene and its homologs, such as chloroethyne, propargyl bromide, etc., as well as acetylene itself and homologs of acetylene, and oxy-substitution products of homologs of acetylene, such as propargyl alcohol, alpha,alpha-dimethylpropargyl alcohol, and the like.

Although the above outlined general procedure may be applied to the preparation of a variety of products of this invention, we preferably employ a modification thereof wherein there is employed a phosphorus trihalide, such as phosphorus trichloride, and the cyclic halophosphite of the 1,2- or 1,3-dihydric alcohol, dithiol, or thioalcohol is prepared as an intermediate. The cyclic chlorophosphite, which is obtainable in good yields from the glycol and the phosphorus trihalide, may be oxidized to the corresponding phosphate either before, concurrently with, or subsequent to partial hydrolysis leading to replacement of the P-halogen by hydroxyl. For example, a glycerol alpha-monoether, such as 3-ethoxy-1,2-propanediol, and phosphorus trichloride are combined in dilute solution in an inert solvent while withdrawing evolved hydrogen chloride, to produce the corresponding 2-chloro-1,3,2-dioxaphospholane, such as 2-chloro-4-ethoxymethyl-1,3,2-dioxaphospholane. By treatment with an oxidizing agent, such as molecular oxygen, hydrogen peroxide, dilute nitric acid, or elemental sulfur or selenium, an oxo, thiono, or seleno group is introduced at the phosphorus atom with or without concurrent replacement of the P-halogen atom by the hydroxyl group. For example, we may add to a mixture of 2-chloro-4-ethoxymethyl-1,3,2-dioxaphospholane with about twice its weight of dioxane a dilute solution of hydrogen peroxide in anhydrous tertiary butyl alcohol while heating to within the range of about 30° C. to about 70° C, to form 2-chloro-4-ethoxymethyl-2-oxo-1,3,2-dioxaphospholane. The 2-chloro-4-ethoxymethyl-2-oxo-1,3,2-dioxaphospholane may be converted in turn to 2-hydroxy - 4 - ethoxymethyl-2-oxo-1,3,2-dioxaphospholane, a clear liquid boiling at about 125° C. to 130° C. under 2.5 mm. Hg pressure, by reaction with the calculated amount of water in the presence of a water miscible solvent, such as dioxane. By substituting elemental sulfur for the solution of hydrogen peroxide in tertiary butyl alcohol we may obtain the corresponding cyclic thionochlorophosphate, 2-chloro-4-ethoxymethyl-2-thiono-1,3,2-dioxaphospholane from which we may prepare, in turn, 2-hydroxy-4-ethoxymethyl-2-thiono-1,3,2-dioxaphospholane and 2-vinyloxy - 4 - ethoxymethyl - 2 - thiono-1,3,2-dioxaphospholane. The synthesis of 2-vinyloxy-4-ethoxymethyl-2-oxo-1,3,2-dioxaphospholane by the procedure outlined above may be represented substantially as in the following equations:

When there is substituted for the ethyl glycerol ether the ether of a beta,gamma-olefinically unsaturated alcohol and glycerol, for example, glycerol alpha monoallyl monoether, there is obtined by this method the corresponding ether of the beta,gamma-olefinically unsaturated alcohol with the 2-vinyloxy-2-oxo-4-hydroxy-1,3,2-phospholane or 2-vinyloxy-2-oxo-5-hydroxy-1,3,2-dioxaphosphorinane depending upon whether an alpha or a beta glycerol monoether is used.

For the synthesis particularly of those compounds of the invention wherein the beta carbon atom of the alpha, beta-olefinically unsaturated residue represented by R is substituted by one or more atoms of halogen we may employ a specific embodiment of the generic method described and claimed in the copending application of Richard R. Whetstone and Denham Harman, Serial No. 274,281, filed concurrently herewith. According to this specific embodiment a cyclic tertiary phosphite, e. g., a 2 - alkoxy-1,3,2-dioxaphospholane or 2-alkoxy-1,3,2-dioxaphosphorinane may be reacted with a halogen-substituted carbonyl compound (aldehyde or ketone) having a plurality of atoms of halogen bonded to a single carbon atom which is adjacent to an aldehyde or ketonic carbonyl group. The reaction produces directly a cyclic phosphate which may be considered to be derived from the cyclic tertiary phosphite by oxidation of the phosphorus atom to the pentavalent state and by replacement of the P-alkoxy group by the beta-halogeno alpha,beta-olefinically unsaturated oxy residue of the enol form of that otherwise corresponding alpha-halogen-substituted carbonyl compound which contains in the alpha position one less halogen atom and one more hydrogen atom than does the alpha-polyhalogenocarbonyl compound actually used. As applied to the synthesis of novel products of this invention the process described and generically claimed in said copending application may be represented as follows:

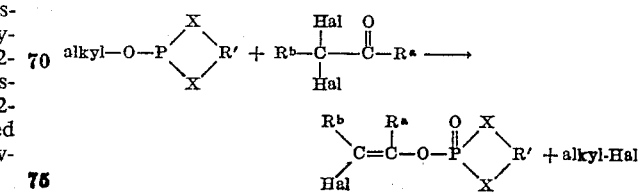

in which each Hal signifies an atom of halogen, alkyl signifies an alkyl group, e. g. methyl ethyl, propyl, or butyl, $R^a$ signifies a member of the class consisting of hydrogen and functionally inert organic radicals $R^b$ signifies one of the class consisting of halogen and $R^a$, X signifies a divalent atom of an element of the chalcogen group, and R' signifies the residue R' of a dihydric alcohol HO—R'—OH wherein the hydroxyl groups are substituted on different carbon atoms which are separated from each other by not more than one carbon atom. A specific illustration of the reaction is provided by the synthesis of 2-(beta,beta-dichlorovinyloxy)-2-oxo-1,3,2-dioxaphospholane from chloral and 2-ethoxy-1,3,2-dioxaphospholane. This specific equation may be represented as follows:

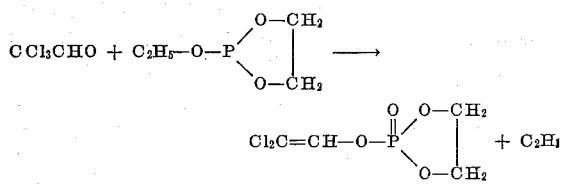

The reaction described generically and specifically by the respective two immediately preceding equations can be effected by heating together the selected alpha-polyhalogeno carbonyl compound and the 2-alkoxy-1,3,2-dioxaphospholane or 2-alkoxy-1,3,2-dioxaphosphorinane at reaction temperatures within the range of from about 30° C. to about 150° C. The alpha-polyhalogeno carbonyl compound and the 2-alkoxy-1,3,2-dioxaphospholane or 2-alkoxy-1,3,2-dioxaphosphorinane may be employed in mole ratios within the range of from 1:10 to 10:1, a preferred range being from 2:1 to 1:2. The reaction leads to displacement of alkyl halide corresponding to the P-alkoxy group of the cyclic phosphite; the evolved alkyl halide should be separated from the reaction mixture, as by continuous distillation, substantially as rapidly as it is formed therein. Upon completion of the reaction, which ordinarily requires no more than about 4 hours, the desired cyclic phosphate may be recovered by conventional techniques, such as fractional distillation, extraction, or the like.

As the alpha-polyhalogeno aldehyde or ketone there may be employed any aldehyde or ketone having a plurality of atoms of halogen substituted on a single carbon atom which is immediately adjacent to an aldehydic or ketonic carbonyl group. Typical alpha-polyhalogeno aldehydes and ketones which may be employed are chloral, alpha,alpha,beta-dichloropropionaldehyde, perchloroacetone, 1,1,1-trichloroacetone, ethyl acetyldichloroacetate, 1,1,1-trichloro-2,4-pentanedione, 3-cyano-2,2-dibromopropanal, dichlorofluoroacetaldehyde, triiodoacetaldehyde, 1,1,1,6,6,6-hexachloro-2,4-pentanedione, 2,2-dichlorocyclohexanone, and trichloroacetophenone. Although there may be employed any 2-alkoxy-1,3,2-dioxaphospholane or 2-alkoxy-1,3,2-dioxaphosphorinane, the highest yields of desired product are obtained when the cyclic phosphite is one which contains no polar groups on the ring carbon atoms which are adjacent to the ring oxygen atoms. Suitable cyclic phosphites include the alkyl 1,2-alkylene phosphites and alkyl 1,3-alkylene phosphites, such as 2-ethoxy-1,3,2-dioxaphospholane, 2-butoxy-4-methyl-1,3,2-dioxaphospholane, 2-isopropoxy-1,3,2-dioxaphosphorinane, 2-propoxy-4-ethyl-1-thia-3-oxa-2-phosphorinane, 2-methoxy-5-butyl-1,3,2-dithiaphosphorinane, and their homologs and analogs.

As a specific example of this method applied to the preparation of novel compounds of this invention we may prepare 2-chloro-4-methyl-1,3,2-dioxaphospholane by reaction of propylene glycol with phosphorus trichloride and convert the 2-chloro-4-methyl-1,3,2-dioxaphospholane to 2-ethoxy-4-methyl-1,3,2-dioxaphospholane or other lower 2-alkoxy-4-methyl-1,3,2-dioxaphospholane by reaction with ethanol or other lower alkanol. We may then heat together in about equimolar proportions the 2-alkoxy-4-methyl-1,3,2-dioxaphospholane and chloral while fractionating ethyl chloride or other lower alkyl chloride corresponding to the P-alkoxy group from the evolved vapors. The reaction proceeds readily at about 40° C. to 50° C. and is completed usually within about three hours. The resulting mixture then is fractionated in vacuo with separation of 2-(beta,beta-dichlorovinyloxy)-4-methyl-2-oxo-1,3,2-dioxaphospholane as a water-white liquid distilling at about 121° C. under 1.7 mm. of mercury pressure.

Compounds of the present invention wherein the residue R of the alpha,beta-olefinically unsaturated alcohol is the vinyl group ($CH_2=CH-$) may also be synthesized conveniently by a specific application of the process disclosed and generically claimed by Richard R. Whetstone and Denham Harman in the copending application Serial No. 274,282, filed concurrently herewith. According to this specific embodiment a monohaloacetaldehyde, preferably monochloroacetaldehyde or monobromoacetaldehyde, is reacted with a cyclic tertiary phosphite, such as a 2-alkoxy-1,3,2-dioxaphospholane or 2-alkoxy-1,3,2-dioxaphosphorinane to produce directly a 2-vinyloxy-2-oxo-1,3,2-dioxaphospholane or 2-vinyloxy-2-oxo-1,3,2-dioxaphosphorinane according to the illustrative equation:

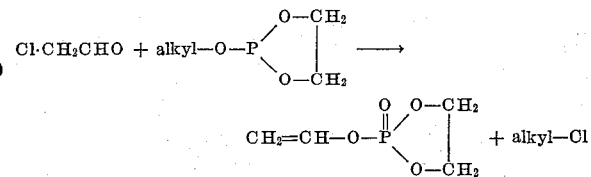

in which alkyl represents a lower alkyl group, such as an alkyl group of from one to four carbon atoms. The reaction is carried out by heating together the monohalogenoacetaldehyde and the cyclic phosphite, preferably in about equimolar proportions, at reaction temperatures within the range of from about 30° C. to about 150° C. while withdrawing evolved halide, as by distillation from the reaction mixture, and then distilling or otherwise recovering the resulting P-vinyloxy cyclic phosphate from the reaction mixture.

Within the generic class of compounds provided by the invention there are certain more restricted groups of compounds which are of particular interest for special applications. One limited group of compounds provided by the invention may be defined by reference to the structural formula:

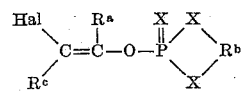

in which Hal represents an atom of halogen, i. e., iodine, bromine, fluorine, or chlorine, $R^a$ represents hydrogen or an organic radical, X represents oxygen or sulfur, $R^b$ represents the divalent radical $R^b$ of a dihydric alcohol HO—$R^b$—OH, and $R^c$ represents halogen or $R^a$. The organic radical represented by $R^a$ may be, for example, an alkyl, aryl, alkaryl, aralkyl, or cycloalkyl group which may be substituted to a minor extent by halogen, cyano, carbonyloxy (—O—OC—), oxy (—O—), nitro, or oxo (=O). $R^b$ may be the residue of an unsubstituted aliphatic dihydric alcohol having the hydroxyl groups bonded to different carbon atoms which are separated from each other by not more than one directly intervening carbon atom. The residue $R^b$ may be composed solely of carbon and hydrogen, for example, a 1,2- or 1,3-alkylene group, or it may bear one or more inert substituents as in the residues derived from the glycerol monoethers, the glycerol halohydrins, and the glycerol monoesters of carboxylic acids.

Illustrative compounds within this subgroup include the following:

2-(beta,beta-dichlorovinyloxy)-2-oxo-1,3,2-dioxaphosphorinane:

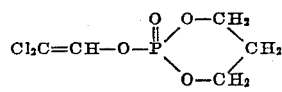

2-(beta,beta-dichlorovinyloxy)-2-oxo-1,3,2-dioxaphosphorinane:

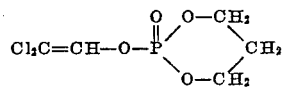

2-(beta-chloro-beta-carbethoxymethylvinyloxy)-4-methyl-2-oxo-1,3,2-dioxaphospholane:

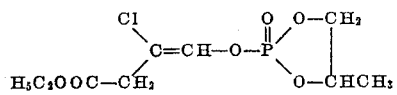

2-(beta-bromo-beta-ethyl-alpha-phenylvinyloxy)-2-thiono-1,3,2-dioxaphospholane:

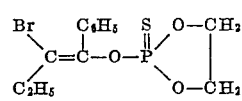

2-(beta-chlorovinyloxy)-2-thiono-1,3,2-dithiaphosphorinane:

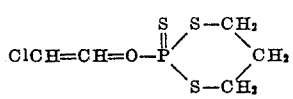

2-(beta-chloro-beta-chloromethylvinyloxy)-2-oxo-1,3,2-dioxaphospholane:

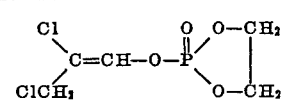

2-(beta-chloro-beta-cyanovinyloxy)-2-oxo-1,3,2-dioxaphosphorinane:

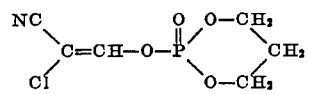

2-(beta-bromo-beta-ethoxymethylvinyloxy)-5-phenoxy-2-oxo-1,3,2-dioxaphosphorinane:

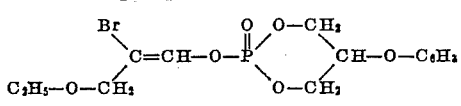

2-(beta,beta-dichlorovinyloxy)-5-propionoxy-2-oxo-1,3,2-dioxaphosphorinane:

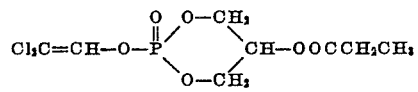

2-(beta-chlorovinyloxy)-4-hexyl-2-thiono-1,3,2-dioxaphospholane:

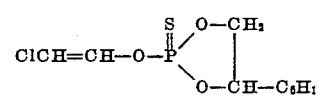

2-(beta-dichlorovinyloxy)-5-dichlorophenoxy-2-oxo-1,3,2-dioxaphosphorinane:

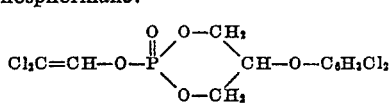

A second subgroup of products of the invention comprises the vinyl esters represented by the structural formula

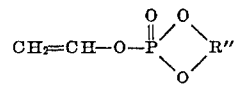

in which R'' is the divalent residue R'' of an aliphatic dihydric alcohol HO—R''—OH wherein the hydroxyl groups are substituted on different carbon atoms which are separated from each other by not more than one directly intervening carbon atom. Although the residue R'' may be the divalent hydrocarbon residue of an alkylene glycol, such as ethylene glycol, propylene glycol, trimethylene glycol, 2,3-butanediol, or 1,2-octanediol, it preferably is the divalent residue of a glycol derived from glycerol by combination of one and only one of the three hydroxyl groups of glycerol in ether linkage with a monohydric alcohol, preferably a beta,gamma-olefinically unsaturated monohydric alcohol. The symbol R'' thus represents an alkylene group, with the proviso that each of the linking oxygen atoms is attached to a different carbon atom of that group, the said carbon atoms attached to said oxygen atoms being separated by not more than one intervening carbon atom. It is preferred that R'' represents an alkylene group of three carbon atoms, with the proviso that each of the linking oxygen atoms is attached to a different atom of the said alkylene group and the remaining carbon atom is linked by an oxy oxygen linkage to a beta,gamma-alkenyl group. Compounds illustrative of this subgroup of compounds within the invention include, among others, the following:

2-vinyloxy-2-oxo-1,3,2-dioxaphosphorinane:

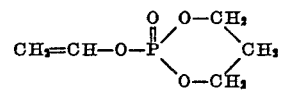

2-vinyloxy-4-propyl-2-oxo-1,3,2-dioxaphospholane:

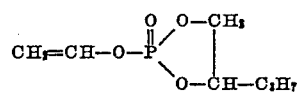

2-vinyloxy-4,5-dimethyl-2-oxo-1,3,2-dioxaphospholane:

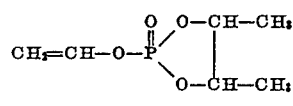

2-vinyloxy-5-isopropoxy-2-oxo-1,3,2-dioxaphosphorinane:

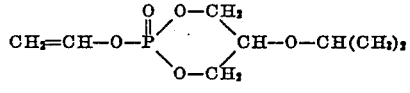

2-vinyloxy-4-methoxymethyl-2-oxo-1,3,2-dioxaphospholane:

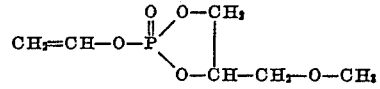

2-vinyloxy-4-isobutoxymethyl-2-oxo-1,3,2-dioxaphospholane:

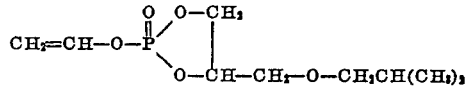

2-vinyloxy-2-oxo-4-hexyl-1,3,2-dioxaphospholane:

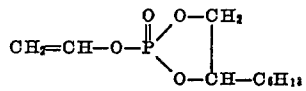

2-vinyloxy-4-allyloxymethyl-2-oxo-1,3,2 - dioxaphospho-
lane:

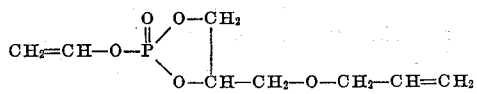

2-vinyloxy-5-methallyloxy- 2- oxo - 1,3,2 - dioxaphosphor-
inane:

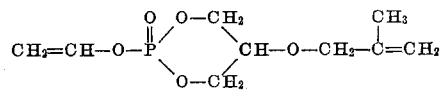

2-vinyloxy-5-(beta-chloroallyloxy) -2- oxo - 1,3,2 - dioxa-
phosphorinane:

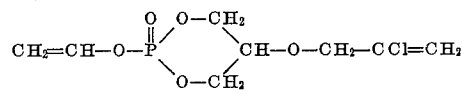

The novel vinylic esters of the present invention are useful as agricultural chemicals, for example, as insecticides, or as intermediates for the synthesis of insecticides, as polymerizable compounds useful for the preparation of resins, and as chemical intermediates from which a variety of useful chemical products can be prepared. Insecticidally active compounds provided by the invention may be employed in combating a wide variety of insects, including the members of the class Insecta and also related arthropods such as mites, spiders, ticks, etc. In applying the products of this invention as insecticides conventional techniques may be used: for example, a 0.01% to 2% solution of the active agent in an inert solvent or diluent, such as a hydrocarbon solvent, may be sprayed into contact with the insect or onto the plant or other object which is to be protected from insects; or the active agent may be incorporated into a dust using known horticultural solid carriers and applied by dusting techniques. The active agents may also be applied by the aerosol technique. The insecticidal agents of the invention may be used as systemic poisons. When thus used the active agent is applied to the plant or to the soil in the vicinity of the plant and is absorbed and translocated within the plant tissues, rendering the plant as a whole toxic to insects which consume edible portions thereof. Useful vinyl-type polymers may be prepared by ethylenic polymerization of the products of the invention. Homopolymers and copolymers with other polymerizable olefinically unsaturated compounds may be prepared, for example, acrylic and methacrylic acid and their esters, amides, and nitriles, vinyl chloride and vinylidene chloride, vinyl esters, such as vinyl acetate, and allyl esters, such as allyl acetate, diallyl phthalate, and allyl vinyloxyacetate. The mono-olefinically unsaturated vinyl esters of the invention may be polymerized to produce polymers ranging from thick viscous liquids to tough resinous solids which are useful as plasticizers for naturally occurring and other synthetic resins, as or in adhesives, and in surface coating compositions. Highly cross-linked polymers may be prepared by polymerization of the poly-olefinically unsaturated esters of the invention, and such poly-olefinically unsaturated esters may further be employed in minor amounts as cross-linking agents in the polymerization of other, dissimilar polymerizable mono-olefinically unsaturated compounds.

It will be appreciated that the invention includes numerous specific embodiments within the letter and spirit of the appended claims.

We claim as our invention:

1. An ester of an alpha, beta-olefinically unsaturated alcohol and a member of the group consisting of the 2-hydroxy-2-oxo-1,3,2-dioxaphospholanes, 2 - hydroxy - 2 - oxo-1,3,2-dioxaphosphorinanes, and the 2-thiono analogues of these compounds, one of the carbon atoms involved in the olefinic linkage of the said alpha,beta-olefinically unsaturated alcohol being attached directly to the ester oxygen atom.

2. An ester of an alpha-beta-olefinically unsaturated alcohol substituted by at least one halogen atom, at least one of said halogen atoms being substituted by the beta carbon atom and a member of the group consisting of the 2-hydroxy-2-oxo-1,3,2-dioxaphospholanes, 2-hydroxy-2-oxo-1,3,2-dioxaphosphorinanes and the 2-thiono analogues of these compounds, one of the carbon atoms involved in the olefinic linkage of the alpha,beta-olefinically unsaturated alcohol being attached directly to the ester oxygen atom.

3. A phosphorus-containing ester having a structure represented by the formula:

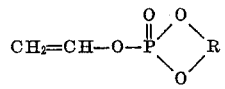

in which R represents an alkylene group of not more than 8 carbon atoms, with the proviso that each of the linking oxygen atoms is attached to a different carbon atom of the said group R, the said carbon atoms of the group R attached to said oxygen atoms being separated by not more than one intervening carbon atom.

4. A phosphorus-containing ester having a structure represented by the formula:

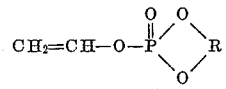

in which R represents a member of the group consisting of the 1,2- and 1,3-alkylene groups of not more than 8 carbon atoms.

5. A phosphorus-containing ester having a structure represented by the formula:

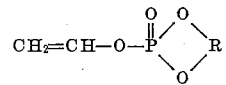

in which R represents an alkylene group of three carbon atoms with the proviso that each of the linking oxygen atoms is attached to a different carbon atom of the said alkylene group and the remaining carbon atom is linked by an oxy oxygen atom to a beta,gamma-alkenyl group.

6. A 2-(beta,beta-dihalovinyloxy)-2-oxo-1,3,2-dioxaphospholane.

7. A 2-(beta,beta-dihalovinyloxy)-2-oxo-1,3,2-dioxaphosphorinane.

8. A 2-(beta-halovinyloxy)-2-oxo-1,3,2-dioxaphosphorinane.

9. An ester of an alpha,beta-olefinically unsaturated alcohol and a 2-hydroxy-2-oxo-1,3,2-dioxaphospholane one of the carbon atoms involved in the olefinic linkage of the alpha,beta-olefinically unsaturated alcohol being attached directly to the ester oxygen atom.

10. An ester of an alpha,beta-olefinically unsaturated alcohol and a 2-hydroxy-2-oxo-1,3,2-dioxaphosphorinane one of the carbon atoms involved in the olefinic linkage of the alpha,beta-olefinically unsaturated alcohol being attached directly to the ester oxygen atom.

11. An ester of an alpha,beta-olefinically unsaturated alcohol and a 2-hydroxy-2-thiono-1,3,2-dioxaphospholane one of the carbon atoms involved in the olefinic linkage of the alpha,beta-olefinically unsaturated alcohol being attached directly to the ester oxygen atom.

12. An ester of an alpha,beta-olefinically unsaturated alcohol and a 2-hydroxy-2-thiono-1,3,2-dioxaphosphorinane one of the carbon atoms involved in the olefinic linkage of the alpha,beta-olefinically unsaturated alcohol being attached directly to the ester oxygen atom.

References Cited in the file of this patent

UNITED STATES PATENTS

| | | |
|---|---|---|
| 2,557,805 | Upson | June 19, 1951 |
| 2,661,365 | Gamrath et al. | Dec. 1, 1953 |
| 2,661,366 | Gamrath et al. | Dec. 1, 1953 |

OTHER REFERENCES

Lucas et al.: Jour. Chem. Soc., vol. 72, pp. 5491–7, Dec. 1950.